(12) United States Patent
Nilsen (10) Patent No.: US 11,556,374 B2
(45) Date of Patent: Jan. 17, 2023

(54) COMPILER-OPTIMIZED CONTEXT SWITCHING WITH COMPILER-INSERTED DATA TABLE FOR IN-USE REGISTER IDENTIFICATION AT A PREFERRED PREEMPTION POINT

(71) Applicant: International Business Machines Corporation, Armonk, NY (US)

(72) Inventor: Kelvin D. Nilsen, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 248 days.

(21) Appl. No.: 16/276,740

(22) Filed: Feb. 15, 2019

(65) Prior Publication Data
US 2020/0264880 A1    Aug. 20, 2020

(51) Int. Cl.
*G06F 9/48* (2006.01)
*G06F 9/46* (2006.01)
*G06F 8/41* (2018.01)
*G06F 9/30* (2018.01)

(52) U.S. Cl.
CPC ........... *G06F 9/461* (2013.01); *G06F 8/4432* (2013.01); *G06F 8/4434* (2013.01); *G06F 8/4441* (2013.01); *G06F 9/3005* (2013.01); *G06F 9/3009* (2013.01); *G06F 9/48* (2013.01)

(58) Field of Classification Search
CPC .... G06F 8/4432; G06F 8/4434; G06F 8/4441; G06F 9/3005; G06F 9/3009; G06F 9/461; G06F 9/48
See application file for complete search history.

(56) References Cited

U.S. PATENT DOCUMENTS

| | | |
|---|---|---|
| 5,815,701 A | 9/1998 | Slavenburg |
| 5,872,963 A | 2/1999 | Bitar et al. |
| 6,061,711 A * | 5/2000 | Song ............... G06F 9/30003 718/108 |
| 6,081,665 A | 6/2000 | Nilsen et al. |
| 7,360,216 B2 | 4/2008 | Spoltore et al. |
| 7,565,659 B2 | 7/2009 | Day et al. |
| 7,756,911 B2 | 7/2010 | Bacon et al. |
| 7,831,961 B1 | 11/2010 | Bush et al. |
| 8,402,429 B2 | 3/2013 | Kielstra |
| 8,909,892 B2 | 12/2014 | Zetterman et al. |
| 9,424,105 B2 | 8/2016 | Park et al. |
| 9,710,354 B2 | 7/2017 | Klausner et al. |
| 9,811,434 B1 | 11/2017 | Wagner |
| 9,870,252 B2 | 1/2018 | Bates |

(Continued)

OTHER PUBLICATIONS

Clercq et al., "Secure Interrupts on Low-End Microcontrollers", 2014, pp. 147-152.*

(Continued)

*Primary Examiner* — David J. Huisman
(74) *Attorney, Agent, or Firm* — Brian Restauro (57) ABSTRACT

Compiler-optimized context switching may include receiving an instruction indicating a preferred preemption point comprising an instruction address; storing the preferred preemption point in a data structure; determining, based on the data structure, that the preferred preemption point has been reached by a first thread; determining that preemption of the first thread for a second thread has been requested; and performing a context switch to the second thread.

20 Claims, 6 Drawing Sheets

(56) References Cited

U.S. PATENT DOCUMENTS

| | | | |
|---|---|---|---|
| 9,996,386 | B2 | 6/2018 | Rauchfuss et al. |
| 10,078,515 | B2 | 9/2018 | Gschwind et al. |
| 10,282,812 | B2 | 5/2019 | Koker et al. |
| 10,552,201 | B2 | 2/2020 | Cuadra et al. |
| 2002/0062463 | A1 | 5/2002 | Hines |
| 2004/0078785 | A1 | 4/2004 | Dutt et al. |
| 2004/0154019 | A1 | 8/2004 | Aamodt et al. |
| 2006/0112377 | A1 | 5/2006 | Nacul et al. |
| 2007/0022423 | A1 | 1/2007 | Bril et al. |
| 2007/0288538 | A1 | 12/2007 | Bacon et al. |
| 2008/0270771 | A1 | 10/2008 | Lee et al. |
| 2010/0251260 | A1 | 9/2010 | May |
| 2011/0202907 | A1 | 8/2011 | Dice et al. |
| 2013/0152096 | A1 | 6/2013 | Park et al. |
| 2014/0115596 | A1 | 4/2014 | Khan et al. |
| 2014/0195788 | A1 | 7/2014 | Kalogeropulos et al. |
| 2016/0140686 | A1* | 5/2016 | Lu .................. G06F 9/30043 345/522 |
| 2017/0269964 | A1 | 9/2017 | Ashbaugh et al. |
| 2018/0293692 | A1 | 10/2018 | Koker et al. |
| 2019/0213329 | A1* | 7/2019 | Meriac ............... G06F 9/455 |
| 2020/0272444 | A1 | 8/2020 | Nilsen |

OTHER PUBLICATIONS

Gregg et al., "A method-level comparison of the Java Grande and SPEC JVM98 benchmark suites", Concurrency Computat.: Pract. Exper. 2005; 17:757-773, Copyright © 2005 John Wiley & Sons, Ltd., 17 pages.

Kim et al., "Micro-Preemption Synthesis: An Enabling Mechanism for Multi-Task VLSI Systems", IEEE, © 1997 IEEEE, pp. 33-38.

Radhakrishnan et al., "Execution Characteristics of Object Oriented Programs on the UltraSPARC-II", Proceedings. Fifth International Conference on High Performance Computing (Cat. No. 98EX238), Dec. 20-20, 1998, 11 pages.

Zhou et al., "Rapid and Low—Cost Context—Switch through Embedded Processor Customization for Real-Time and Control Applications", DAC 2006, Jul. 24-28, 2006, San Francisco, California, Copyright 2006 ACM, pp. 352-357.

U.S. Appl. No. 16/734,739, entitled, "Context Switching Locations For Compiler-Assisted Context Switching", assigned to International Business Machines Corporation, 151 pages, filed Jan. 6, 2020.

IBM Appendix P., "List of IBM Patents or Patent Applications to be Treated as Related", Dated Herewith, 2 pages.

Lin et al., *Enabling Efficient Preemption for SIMT Architectures with Lightweight Context Switching*, Proceedings of the International Conference for High Performance Computing, Networking, Storage and Analysis (SC16), Article 77, Nov. 2016, 11 pages, IEEE Press, Piscataway, NJ, USA, ISBN: 978-1-4673-8815-3.

Zhou et al., *Cross-Layer Customization for Rapid and Low-Cost Task Preemption in Multitasked Embedded Systems*, ACM Transactions on Embedded Computing Systems (TECS), vol. 8, Issue 2, Article 14, Jan. 2009, 28 pages, ACM New York, USA, DOI: 10.1145/1457255.1457261.

Kumar et al., *Low Overhead Program Monitoring and Profiling*, ACM SIGSOFT Software Engineering Notes, vol. 31 Issue 1, Jan. 2006, pp. 28-34, ACM New York, USA, DOI: 10.1145/1108768.1108801.

Snyder et al., *Fast Context Switches: Compiler and Architectural Support for Preemptive Scheduling*, Microprocessors and Microsystems, vol. 19, Issue 1, Feb. 1995, pp. 35-42, Elsevier B.V., UK, ISSN: 0141-9331.

Albrecht et al., "Cooperative Software Multithreading to Enhance Utilization of Embedded Processors for Network Applications", Proceedings of the 12th Euromicro Conference on Parallel, Distributed and Network-Based Processing, Feb. 2004, 8 pages, IEEE Computer Society, USA.

Bertogna et al., "Optimal Selection of Preemption Points to Minimize Preemption Overhead", 23rd Euromicro Conference on Real-Time Systems, Jul. 2011, 11 pages, IEEE Computer Society, USA.

Bril et al., "Improved Feasibility of Fixed-Priority Scheduling with Deferred Preemption Using Preemption Thresholds for Preemption Points", Proceedings of the 21st International Conference on Real-Time Networks and Systems (RTNS 13), Oct. 2013, pp. 255-264, ACM, New York, NY.

Degenbaev et al., "Idle Time Garbage Collection Scheduling", Proceedings of the 37th ACM SIGPLAN Conference on Programming Language Design and Implementation (PLDI'16), Jun. 2016, pp. 570-583, ACM, New York, NY.

Github, Inc., "Runtime: Tight Loops Should Be Preemptible", Issue #10958, May 2015, 19 pages, https://github.com/golang/go/issues/10958.

Jaaskelainen et al., "Reducing Context Switch Overhead with Compiler-Assisted Threading", IEEE/IFIP International Conference on Embedded and Ubiquitous Computing, Dec. 2008, 6 pages, IEEE Computer Society, USA.

Kalibera, "Replicating Real-Time Garbage Collector", Concurrency and Computation: Practice and Experience, Oct. 2010, 22 pages, John Wiley & Sons, Ltd., USA.

Kim et al., "Perfecting Preemption Threshold Scheduling for Object-Oriented Real-Time System Design: From the Perspective of Real-Time Synchronization", Proceedings of the Joint Conference on Languages, Compilers and Tools for Embedded Systems: Software and Compilers for Embedded Systems (LCTES/SCOPES '02), Jun. 2002, pp. 223-232, ACM New York, NY, USA.

Lee et al., "Preemptible I/O Scheduling of Garbage Collection for Solid State Drives", IEEE Transactions on Computer-Aided Design of Integrated Circuits and Systems, vol. 32, No. 2, Feb. 2013, pp. 247-260, IEEE Computer Society, USA.

Linux, "Kill (1)", Linux Programmer's Manual, Oct. 14, 1994, 3 pages, Network Admin Tools (online), URL: https://www.netadmintools.com/html/1kill.man.html.

Manson et al., "Preemptible Atomic Regions for Real-Time Java", Proceedings of the 26th IEEE International Real-Time Systems Symposium (RTSS'05), Dec. 2005, 10 pages, IEEE Computer Society, USA.

Peng et al., "Explicit Preemption Placement for Real-Time Conditional Code", 26th Euromicro Conference on Real-Time Systems, Jul. 2014, 12 pages, IEEE Computer Society, USA.

Pruthvi et al., "RTOS Acceleration by Reducing Overhead due to Context Switching", International Journal of Technology and Engineering Science vol. 1 (4), Jul. 2013, 5 pages.

Ramaprasad et al., "Tightening the Bounds on Feasible Preemption Points", Proceedings of the 27th IEEE International Real-Time Systems Symposium (RTSS'06), Dec. 2006, 1 page, IEEE Computer Society, USA.

Schoeberl, Scheduling of Hard Real-Time Garbage Collection, Real-Time Systems, Aug. 2010, vol. 45, Issue 3, 37 pages, https://www.researchgate.net/publication/220414151_Scheduling_of_hard_real-time_garbage_collection.

Shieh et al., "Enabling Fast Preemption via Dual-Kernel Support on GPUs", 22nd Asia and South Pacific Design Automation Conference (ASP-DAC), Jan. 2017, 6 pages, IEEE Computer Society, USA.

Simonson et al., "Use of Preferred Preemption Points in Cache-Based Real-Time Systems", Proceedings of 1995 IEEE International Computer Performance and Dependability Symposium, Apr. 1995, 10 pages, IEEE Computer Society, USA.

Yu et al., "Sim Latte: A Framework to Support Testing for Worst-Case Interrupt Latencies in Embedded Software", IEEE Seventh International Conference on Software Testing, Verification and Validation, Mar. 2014, 10 pages, IEEE Computer Society, USA.

IBM Appendix P, "List of IBM Patents or Patent Applications to be Treated as Related", Jun. 22, 2021, 2 pages.

\* cited by examiner

COMPILER-OPTIMIZED CONTEXT SWITCHING WITH COMPILER-INSERTED DATA TABLE FOR IN-USE REGISTER IDENTIFICATION AT A PREFERRED PREEMPTION POINT

BACKGROUND

Field of the Invention

The field of the invention is data processing, or, more specifically, methods, apparatus, and products for compiler-optimized context switching.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Processors are able to process multiple threads in parallel by performing a context switch between threads. A context switch causes the processing of a first thread to be interrupted and the state of the first thread (e.g., register values, program counter values, addresses of instructions to be executed next) to be saved in memory. The state of a second thread may then be loaded (e.g., values loaded into the registers, program counter values set) so that the second thread may be processed until another context switch back to the first thread. Context switching requires an amount of computational overhead and processing time dependent on the amount of data saved and loaded.

SUMMARY

Compiler-optimized context switching may include: receiving an instruction indicating a preferred preemption point comprising an instruction address; storing the preferred preemption point in a data structure; determining, based on the data structure, that the preferred preemption point has been reached by a first thread; determining that preemption of the first thread for a second thread has been requested; and performing a context switch to the second thread.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
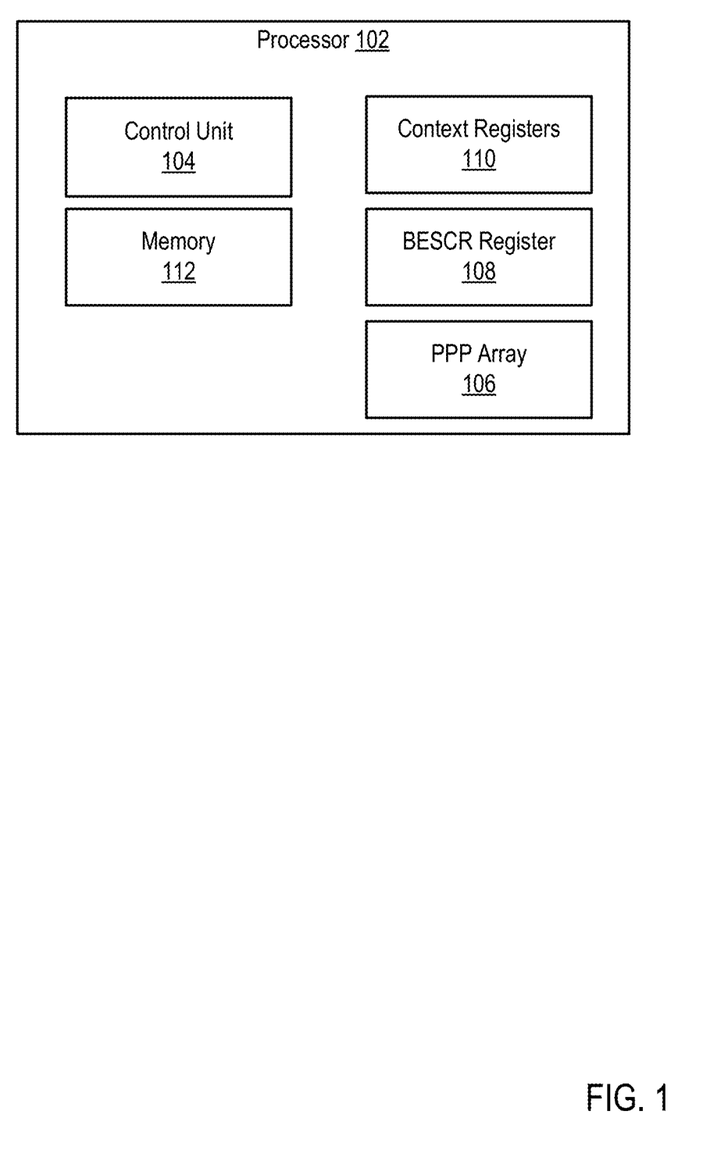
FIG. 1 is a block diagram of a processor configured for compiler-optimized context switching.

Exemplary methods, apparatus, and products for compiler-optimized context switching in accordance with the present invention are described with reference to the accompanying drawings, beginning with FIG. 1. FIG. 1 sets forth a block diagram of a processor 102 configured for compiler-optimized context switching according to embodiments of the present invention. The system of FIG. 1 includes a control unit 104 that directs operation of the processor 102. For example, the control unit 104 may control the storage and loading of data and/or instructions. The control unit 104 may also interpret and/or decode instructions into commands and/or signals. The control unit 104 may control transfer of instructions and/or data in the processor 102. The control unit 104 may also coordinate various parts of the processor 102 (e.g., processing cores, functional units, etc.).

The processor 102 (e.g., the control unit 104) may receive an instruction (e.g., from an instruction stack or call stack) indicating a preferred preemption point. A preferred preemption point is an instruction address that a compiler has determined to be a preferred point to perform a context switch from a first thread to a second thread. Accordingly, if an operating system or managed run-time environment has requested that a context switch be performed, the control unit 104 should preferentially initiate the context switch when the program counter has reached an instruction indicated as a preferred preemption point.

The instruction indicating a preferred preemption point may be identified by the compiler-generated operation "preempt_at" with a first operand being an instruction address of the preferred preemption point. The instruction address of the preferred preemption point may comprise a program counter-relative address (e.g., an address offset). The instruction indicating the preferred preemption point may also comprise a second operand as an M-bit index value.

In response to receiving the instruction indicating the preferred preemption point, the processor 102 (e.g., the control unit 104) may store the preferred preemption point in a data structure. For example, the processor 102 may store the preferred preemption point in a Preferred Preemption Point (PPP) Array 106. The PPP Array 106 comprises an indexed plurality of registers (e.g., an array of registers). For example, the PPP Array 106 may comprise $N=2^M$ registers, where M is a number of bits of an index value operand of the instruction indicating the preferred preemption point. Accordingly, storing the preferred preemption point in a data structure may comprise storing the instruction address operand of the instruction in the PPP Array 106 at an index defined by the index value operand.

The processor 102 (e.g., the control unit 104) may then determine that a preferred preemption point has been reached by a first thread. For example, the control unit 104 may compare the current program counter value to the one or more entries in the PPP Array 106. The processor 102 may then determine that a preferred preemption point has been reached by the first thread based on a match between the program counter and an entry in the PPP Array 106.

The processor 102 (e.g., the control unit 104) may then determine that preemption of the first thread for a second thread has been requested (e.g., by an operating system or managed run-time environment). For example, the control unit 104 may determine that the operating system or managed run-time environment has requested preemption of the first thread for a second thread based on a state of a bit of a register. The register may be accessible to and modifiable by the operating system or managed run-time environment. The operating system or managed run-time environment may then set the bit to "1" when requesting preemption of the first thread for the second thread. Such a bit may be hereinafter referred to as a Preferred Preemption Point Exception Enabled (PPPEE) bit.

For example, the register comprising the bit indicating that the operating system or managed run-time environment has requested preemption of the first thread for a second thread may comprise a Branch Event Status and Control (BESCR) Register 108. Accordingly, the bit may comprise a previously reserved bit of the BESCR Register 108, e.g. bit 28. It is understood that the use of the BESCR Register 108 for storing the bit indicating that the operating system or managed run-time environment has requested preemption of the first thread for a second thread is exemplary, and that other registers or memory may also be used to store the bit indicating that the operating system or managed run-time environment has requested preemption of the first thread for a second thread.

The processor 102 (e.g., the control unit 104) may modify the state of another bit of a register (e.g., the BESCR Register 108) indicating that a Preferred Preemption Point Exception (PPPE) has occurred (e.g., the program counter has reached a preferred preemption point and preemption has been requested). Such a bit may be hereinafter referred to as a Preferred Preemption Point Exception Occurred (PPPEO) bit. For example, the processor 102 may set a reserved bit of the BESCR Register 108 (e.g., bit 60) to "1," indicating that the PPPE has occurred. Thus, when an event-based exception handler is called, the exception handler may access this bit to determine that the exception handler was called due to the PPPE occurring.

The processor 102 may then perform a context switch from the first thread to the second thread. For example, the processor 102 may determine one or more context registers of a plurality of context registers 110. The context registers 110 comprise registers accessible to and modifiable by one or more executed threads. Determining the one or more context registers may comprise accessing a table (e.g., a compiler-generated table) indicating the one or more context registers as being in use by a function when the preferred preemption point is reached. For example, a compiler may generate a table for each function. A table entry for a given function may indicate a preferred preemption point within that function and the one or more context registers in use by the function at the preferred preemption point. For the purposes of this disclosure, the context registers 110 may exclude a stack pointer and/or instruction pointer. Since these two registers are assumed to always be live, they do not need not be explicitly addressed in the mechanism that conditionally saves and restores only the registers currently being used by the respective threads.

Performing the context switch may then comprise saving one or more values stored in the determined one or more context registers 110. This allows the values of registers used by the first thread to be later restored when performing a context switch back to the first thread. For example, the values may be saved to memory 112. The memory 112 may comprise embedded Dynamic Random Access Memory (eDRAM). The values of the registers may also be saved to a cache, to other Random Access Memory (RAM), to disk storage, or otherwise saved.

The processor 102 may then overwrite each of the context registers 110 (e.g., the determined one or more context registers 110 and the remaining context registers 110). Overwriting the context registers 110 may comprise storing a "0" value, some other predefined value, or a randomly generated value into each of the context registers 110. This may hereinafter be referred to as a "purge" phase of overwriting the context registers 110. This prevents data leakage between threads that may occur by accessing, by one thread, values stored in registers used by another thread. The purge phase may be performed by a single instruction, or by a number of instructions that is less than or equal to the number of purged context registers 110.

Overwriting the context registers 110 may also comprise loading (e.g., "restoring"), into one or more of the context registers 110, one or more saved values associated with the second thread. For example, the one or more values associated with the second thread may have been previously stored in the context registers 110 and saved as a result of a context switch from the second thread. In other words, overwriting the context registers 110 may comprise a "purge" phase during which a value is stored in each of the context registers, and a "restore" phase where saved values previously stored in context registers 110 are reloaded into their respective context registers. Although the context registers 110 into which a value is loaded in the "restore" phase were previously overwritten during the "purge" phase, this approach (where all context registers 110 are purged prior to the restore phase) is more efficient than selectively overwriting or purging only those context registers 110 not used by the second thread. As was set forth above, the context registers 110 may exclude a stack pointer and/or instruction pointer. Accordingly, the stack pointer and/or instruction pointer would not be purged. The processor 102 may then begin executing instructions of the second thread.

After completing the functionality of the second thread for which preemption was requested, the processor 102 may then perform another context switch back to the first thread. Performing the other context switch to the first thread may comprise overwriting each of the context registers 110 (e.g., by storing, into each of the context registers 110, "0" or another value) and loading, into the determined context registers 110 (e.g., the context registers 110 used by the first thread at the preferred preemption point) the saved values. Performing the other context switch to the first thread may comprise modifying a state of the bit indicating that preemption of the first thread has been requested (e.g., the PPPEE bit). For example, the PPPEE bit may be set to "0," as the preemption of the first thread by the second thread has been resolved. If used, the PPPEO bit may also be set to "0."

Performing the context switch from the first thread to the second thread may be facilitated by an exception handler. For example, the processor 102 may set the PPPEO bit to "1," indicating that a PPPE has occurred. The processor 102 may also store (e.g., in one or more reserved bits of the BESCR Register 108 or in another data structure or storage unit) an indication of the preferred preemption point that was reached to cause the PPPE to occur. For example, assuming a PPP Array 106 size of N, M bits of the BESCR Register 108 (or another register) may be used to indicate the PPP Array 106 index of the preferred preemption point that was reached to cause the PPPE to occur where N=2^M. Assuming that the preferred preemption point at PPP Array 106 index [i] caused the PPPE to occur, the processor 102 would then set the M bits to the value of [i]. These reserved M bits are hereinafter referred to as the PPPE Hash.

The processor 102 may then trigger the exception handler. The exception handler would access the PPPEO bit, set to "1," to determine that the exception handler was triggered due to a PPPE. The exception handler would then access the PPPE Hash to determine an index [i] of the PPP Array 106, and load the instruction address at PPP Array 106 index [i]. The exception handler may then load the table entry corresponding to the loaded instruction address to determine which context registers 110 must be saved in order to perform the context switch. The exception handler may then save the determined context registers 110 before yielding control to the operating system or managed run-time environment which requested preemption of the thread. The operating system or managed run-time environment may then purge the contents of all context registers 110 and may further modify the state of a bit indicating that preemption of the first thread (e.g., the PPPEE bit) has been requested. For example, the PPPEE bit may be set to "0" as the thread to which the preemption request was directed has yielded to the request. If used, the PPPEO bit may also be set to "0." Then the operating system may resume execution of a second thread, and the second thread may restore the context registers 110 which were determined used by that second thread.

Compiler-optimized context switching in accordance with the present invention is generally implemented with computers, that is, with automated computing machinery. For further explanation, therefore, FIG. 2 sets forth a block diagram of automated computing machinery comprising an exemplary computer 202 configured for compiler-optimized context switching according to embodiments of the present invention. The computer 202 of FIG. 2 includes at least one computer processor 102 or 'CPU' as well as random access memory 204 ('RAM') which is connected through a high speed memory bus 206 and bus adapter 208 to processor 102 and to other components of the computer 202.

Figure 2:
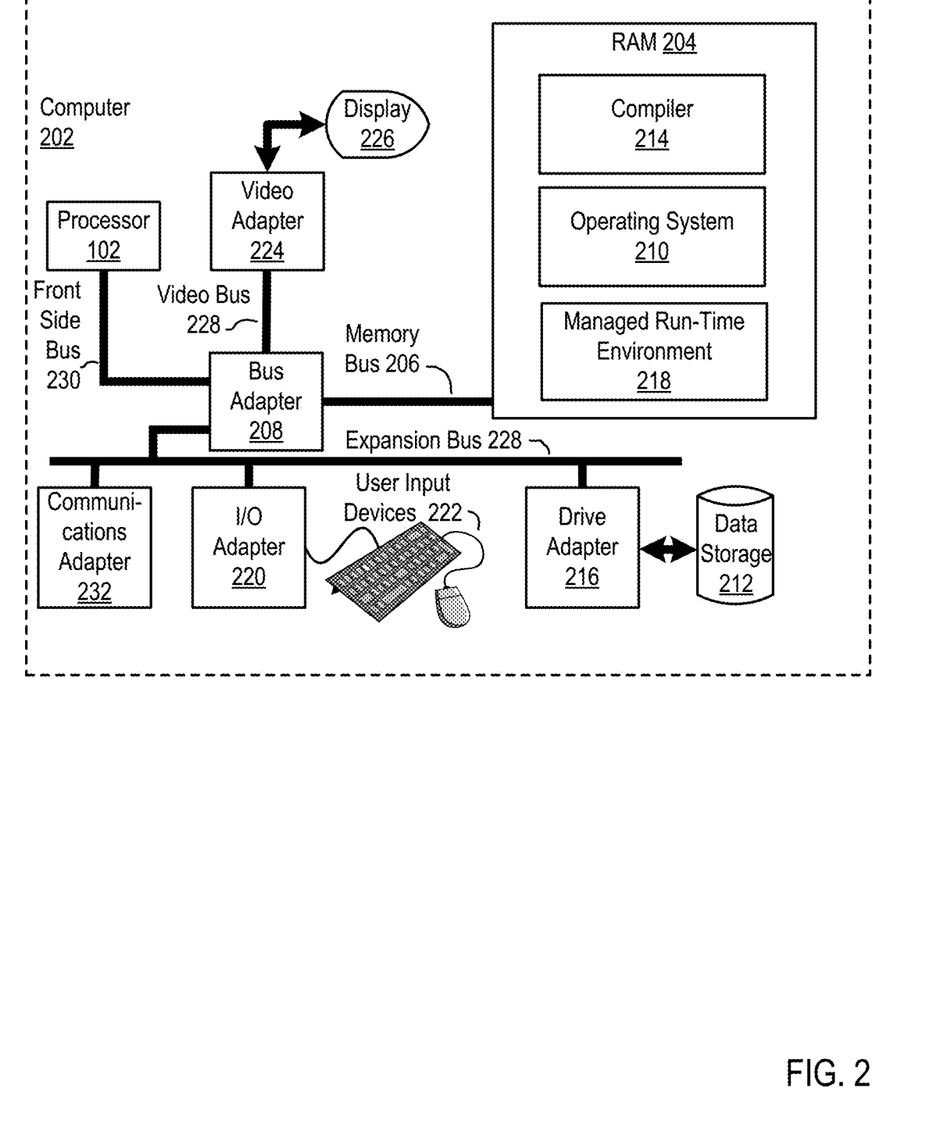
FIG. 2 is a block diagram of an example system for compiler-optimized context switching.

Stored in RAM 204 is an operating system 210. Operating systems useful in computers configured for compiler-optimized context switching according to embodiments of the present invention include UNIX™, Linux™, Microsoft Windows™, AIX™, IBM's i OS™, and others as will occur to those of skill in the art. Also stored in RAM 204 may be a managed run-time environment 218. Managed run-time environments useful in computers configured for compiler-optimized context switching according to the embodiments of the present invention include Java™ Virtual Machine (JVM) and Common Language Runtime (CLR). The operating system 208 and managed run-time environment 218 in the example of FIG. 2 are shown in RAM 204, but many components of such software typically are stored in non-volatile memory also, such as, for example, on data storage 212, such as a disk drive. Also stored in RAM is the compiler 214 for compiler-optimized context switching according to embodiments of the present invention.

The compiler 214 may be configured to compile code (e.g., source code) into processor-executable instructions. During code compilation, the compiler 214 may determine one or more preferred preemption points. For example, the compiler 214 may determine an instruction in a function where a number of registers falls below a predefined threshold. The address of a determined instruction may then be determined to be a preferred preemption point. The compiler 214 may then encode, into the processor-executable instructions, an instruction indicating the preferred preemption point (e.g., a "preempt_at" instruction). For example, the instruction may be included at the beginning of a function comprising the preferred preemption point. Thus, on execution of the function, each preferred preemption point for that function is stored in the PPP Array 106. As another example, the instruction may be included outside of a loop or other recursive and/or iterative operation comprising the preferred preemption point. Thus, the preferred preemption point need only be identified once for the multiple times it may be encountered during the operation.

The instruction may be included with the instruction address of the preferred preemption point as a first operand. The instruction may also be included with an index value as a second operand. The index value may be based on an order in which the preferred preemption point is encountered in a given function, source code file, or other set of operations. For example, the first preferred preemption point may be given index value "0," while the second preferred preemption point may be given index value "1," etc.

The compiler 214 determines one or more context registers 110 in use at each preferred preemption point. The compiler 214 may then insert, into the processor-executable instructions, a data table that indicates which context registers 110 are determined used at each preferred preemption point. A tailored copy of this data structure may be inserted once for each function at a known offset from the function's entry point. The table may then be referenced (e.g., by an exception handler) to determine which context registers 110 to save in order to perform a context switch. The data table may comprise one entry for each preferred preemption point contained within the function. In the case that there are more preferred preemption points in the function than N, the table may have more entries than N and may use software hashing based on the address of the encountered preemption point to resolve which entry determines the used context registers 110 in one embodiment. The data table may also comprise exactly N entries, with each entry representing a set of used context registers 110 that is a superset of the used context registers 110 associated with each preferred preemption point that maps to this entry. The function's implementation may include instructions to change the table that is used to determine used context registers 110 during each part of the function's execution, so that table entry [i] always exactly describes the used context registers 110 each time a requested preemption causes a PPPE to execute.

The computer 202 of FIG. 2 includes disk drive adapter 216 coupled through expansion bus 228 and bus adapter 208 to processor 102 and other components of the computer 202. Disk drive adapter 216 connects non-volatile data storage to the computer 202 in the form of data storage 212. Disk drive adapters useful in computers configured for compiler-optimized context switching according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 202 of FIG. 2 includes one or more input/output ('I/O') adapters 220. I/O adapters implement user-oriented input/output through, for example, software drivers and computer hardware for controlling output to display devices such as computer display screens, as well as user input from user input devices 222 such as keyboards and mice. The example computer 202 of FIG. 2 includes a video adapter 224, which is an example of an I/O adapter specially designed for graphic output to a display device 226 such as a display screen or computer monitor. Video adapter 224 is connected to processor 102 through a high speed video bus 228, bus adapter 208, and the front side bus 230, which is also a high speed bus.

The exemplary computer 202 of FIG. 2 includes a communications adapter 232 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for compiler-optimized context switching according to embodiments of the present invention include modems for wired dial-up communications, Ethernet (IEEE 802.3) adapters for wired data communications, and 802.11 adapters for wireless data communications.

Figure 3:
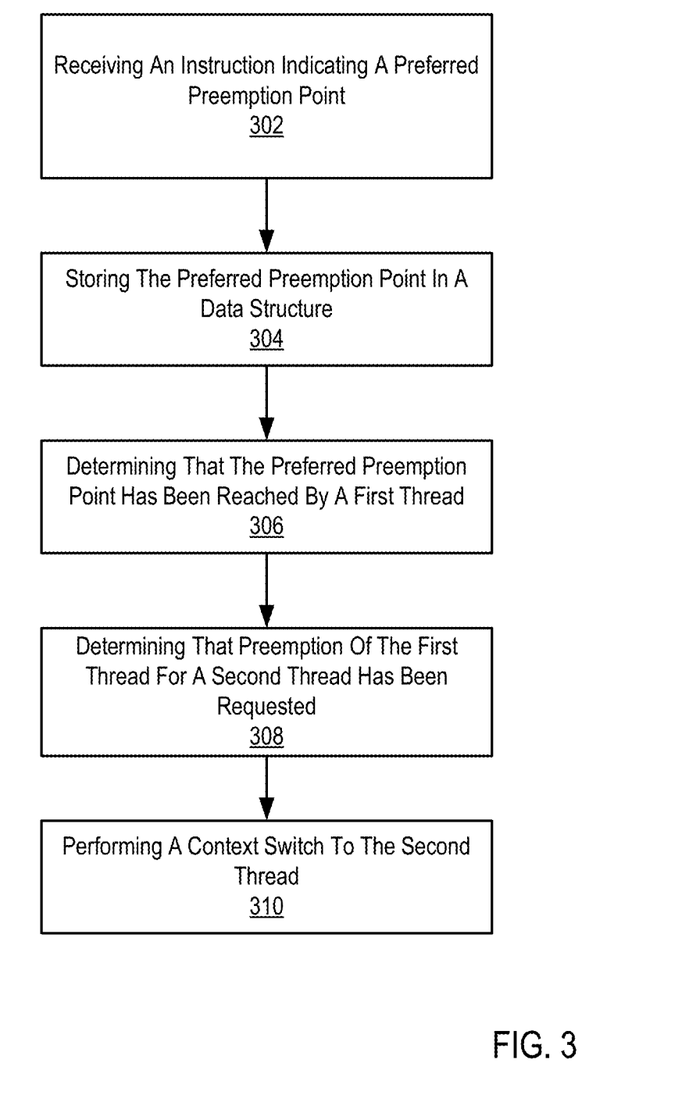
FIG. 3 is a flowchart of an example method for compiler-optimized context switching.

For further explanation, FIG. 3 sets forth a flow chart illustrating an exemplary method for compiler-optimized context switching according to embodiments of the present invention that includes receiving 302 (e.g., by a processor 102, by a control unit 104 of a processor 102) an instruction (e.g., from an instruction stack or call stack) indicating a preferred preemption point. A preferred preemption point is an instruction address that a compiler has determined to be a preferred point to perform a context switch from a first thread to a second thread. Accordingly, if an operating system or managed run-time environment has requested that a context switch be performed, the control unit 104 should preferentially initiate the context switch when the program counter has reached an instruction indicated as a preferred preemption point.

The instruction indicating a preferred preemption point may be identified by the compiler-generated operation "preempt_at" with a first operand being an instruction address of the preferred preemption point. The instruction address of the preferred preemption point may comprise a program counter-relative address (e.g., an address offset). The instruction indicating the preferred preemption point may also comprise a second operand as an M-bit index value.

The method of FIG. 3 may further comprise storing 304 (e.g., by the processor 102, by the control unit 104 of the processor 102) the preferred preemption point in a data structure. For example, the processor 102 may store the preferred preemption point in a Preferred Preemption Point (PPP) Array 106. The PPP Array 106 comprises an indexed plurality of registers (e.g., an array of registers). For example, the PPP Array 106 may comprise N=2^M registers, where M is a number of bits of an index value operand of the instruction indicating the preferred preemption point. Accordingly, storing the preferred preemption point in a data structure may comprise storing the instruction address operand of the instruction in the PPP Array 106 at an index defined by the index value operand.

The method of FIG. 3 may further comprise determining 306 (e.g., by the processor 102, by the control unit 104 of the processor 102) that a preferred preemption point has been reached by a first thread. For example, the control unit 104 may compare the current program counter value to the one or more entries in the PPP Array 106. The processor 102 may then determine that a preferred preemption point has been reached by the first thread based on a match between the program counter and an entry in the PPP Array 106.

The method of FIG. 3 may further comprise determining 308 (e.g., by the processor 102, by the control unit 104 of the processor 102) that preemption of the first thread for a second thread has been requested (e.g., by an operating system or managed run-time environment). For example, the control unit 104 may determine that preemption of the first thread for a second thread based on a state of a bit of a register has been requested. The register may be accessible to and modifiable by the operating system or managed run-time environment. The operating system or managed run-time environment may then set the bit to "1" when requesting preemption of the first thread for the second thread. Such a bit may be hereinafter referred to as a Preferred Preemption Point Exception Enabled (PPPEE) bit.

For example, the register comprising the bit indicating that the operating system or managed run-time environment has requested preemption of the first thread for a second thread may comprise a Branch Event Status and Control (BESCR) Register 108. Accordingly, the bit may comprise a previously reserved bit of the BESCR Register 108, e.g. bit 28. It is understood that the use of the BESCR Register 108 for storing the bit indicating that preemption of the first thread for a second thread has been requested is exemplary, and that other registers or memory may also be used to store the bit indicating that preemption of the first thread for a second thread has been requested. The method of claim 3 may further comprise performing 310 a context switch from the first thread to the second thread.

Figure 4:
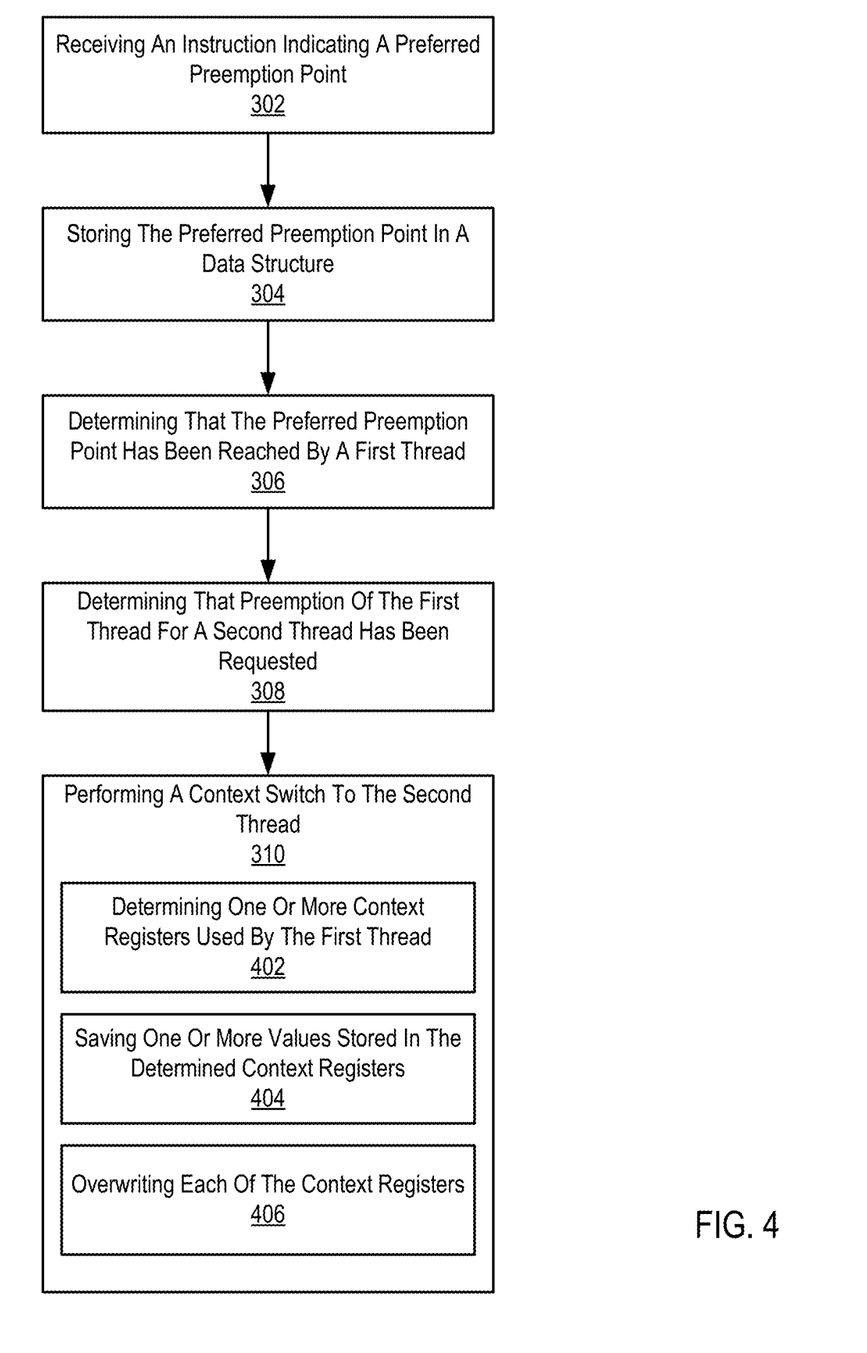
FIG. 4 is a flowchart of an example method for compiler-optimized context switching.

For further explanation, FIG. 4 sets forth a flow chart illustrating a further exemplary method for compiler-optimized context switching according to embodiments of the present invention that includes: receiving 302 an instruction indicating a preferred preemption point; storing 304 the preferred preemption point in a data structure, determining 306 that the preferred preemption point has been reached by a first thread 306, determining 308 that preemption of a first thread for a second thread has been requested, and performing 310 a context switch to the second thread.

FIG. 4 differs from FIG. 3 in that performing 310 a context switch from the first thread to the second thread further comprises determining 402 one or more context registers of a plurality of context registers 110 used by the first thread. The context registers 110 comprise registers accessible to and modifiable by one or more executed threads. Determining the one or more context registers may comprise accessing a table (e.g., a compiler-generated table) indicating the one or more context registers as being in use by a function when the preferred preemption point is reached. For example, a compiler may generate a table for each function. A table entry for a given function may indicate a preferred preemption point within that function and the one or more context registers in use by the function at the preferred preemption point.

FIG. 4 further differs from FIG. 3 in that performing 310 a context switch from the first thread to the second thread further comprises saving 404 one or more values stored in the determined one or more context registers 110. This allows the values of registers used by the first thread to be later restored when performing a context switch back to the first thread. For example, the values may be saved to memory 112. The values of the registers may also be saved to a cache, to other Random Access Memory (RAM), to disk storage, or otherwise saved.

FIG. 4 further differs from FIG. 3 in that performing 310 a context switch from the first thread to the second thread further comprises overwriting 406 each of the context registers 110 (e.g., the determined one or more context registers 110 and the remaining context registers 110). Overwriting the context registers 110 may comprise storing a "0" value, some other predefined value, or a randomly generated value into each of the context registers 110. This may hereinafter be referred to as a "purge" phase of overwriting the context registers 110. This prevents data leakage between threads that may occur by accessing, by one thread, values stored in registers used by another thread. The purge phase may be performed by a single instruction, or by a number of instructions that is less than or equal to the number of purged context registers 110.

Overwriting the context registers 110 may also comprise loading (e.g., "restoring"), into one or more of the context registers 110, one or more saved values associated with the second thread. For example, the one or more values associated with the second thread may have been previously stored in the context registers 110 and saved as a result of a context switch from the second thread. In other words, overwriting the context registers 110 may comprise a "purge" phase during which a value is stored in each of the context registers, and a "restore" phase where saved values previously stored in context registers 110 are reloaded into their respective context registers. Although the context registers 110 into which a value is loaded in the "restore" phase were previously overwritten during the "purge" phase, this approach (where all context registers 110 are purged prior to the restore phase) is more efficient than selectively overwriting or purging only those context registers 110 not used by the second thread. As was set forth above, the context registers 110 may exclude a stack pointer and/or instruction pointer. Accordingly, the stack pointer and/or instruction pointer would not be overwritten during the purge phase. After restoring the one or more saved context registers 110 associated with the second thread and restoring the second thread's saved instruction and stack pointers, the processor 102 may then begin executing instructions of the second thread.

Performing the context switch from the first thread to the second thread may be facilitated by an exception handler. For example, the processor 102 may set the PPPEO bit to "1," indicating that a PPPE has occurred. The processor 102 may also store (e.g., in one or more reserved bits of the BESCR Register 108 or in another data structure or storage unit) an indication of the preferred preemption point that was reached to cause the PPPE to occur. For example, assuming a PPP Array 106 size of N, M bits of the BESCR Register 108 (or another register) may be used to indicate the PPP Array 106 index of the preferred preemption point that was reached to cause the PPPE to occur where N=2^M. Assuming that the preferred preemption point at PPP Array 106 index [i] caused the PPPE to occur, the processor 102 would then set the M bits to the value of [i]. These reserved M bits are hereinafter referred to as the PPPE Hash.

The processor 102 may then trigger the exception handler. The exception handler would access the PPPEO bit, set to "1," to determine that the exception handler was triggered due to a PPPE. The exception handler would then access the PPPE Hash to determine an index [i] of the PPP Array 106, and load the instruction address at PPP Array 106 index [i]. The exception handler may then load the table entry corresponding to the loaded instruction address to determine which context registers 110 must be saved in order to perform the context switch.

Figure 5:
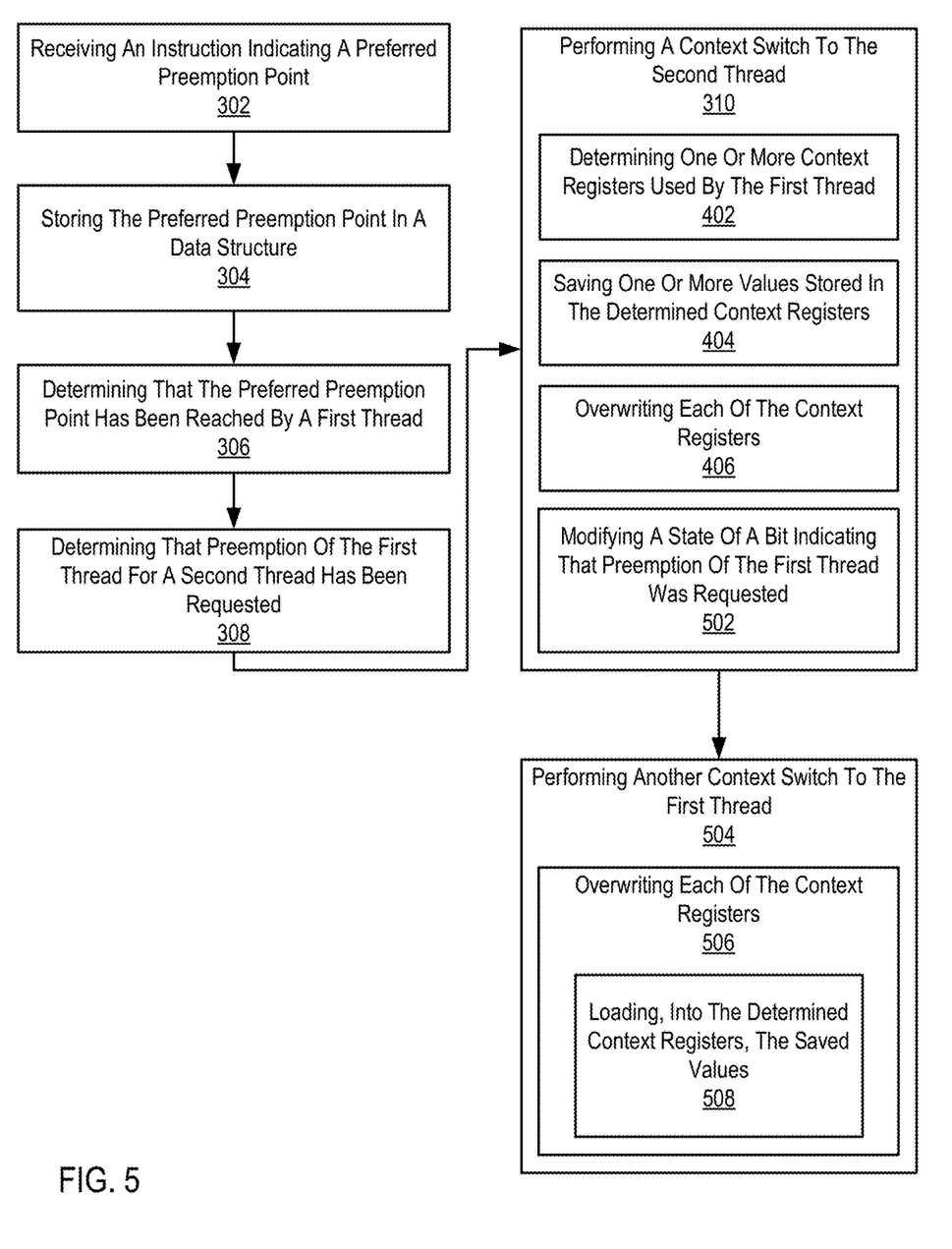
FIG. 5 is a flowchart of an example method for compiler-optimized context switching.

For further explanation, FIG. 5 sets forth a flow chart illustrating a further exemplary method for compiler-optimized context switching according to embodiments of the present invention that includes: receiving 302 an instruction indicating a preferred preemption point; storing 304 the preferred preemption point in a data structure, determining 306 that the preferred preemption point has been reached by a first thread 306, determining 308 preemption of the first thread for a second thread has been requested, and performing 310 a context switch to the second thread, where performing 310 a context switch to the second thread comprises determining 402 one or more context registers 110 used by the first thread; saving 404 one or more values stored in the determined context registers 110; and overwriting 406 each of the context registers 110.

FIG. 5 differs from FIG. 4 in that the method of FIG. 5 further comprises modifying 502 a state of the bit indicating that the operating system has requested preemption of the first thread (e.g., the PPPEE bit). For example, the PPPEE bit may be set to "0,". If used, the PPPEO bit may also be set to "0." The method of FIG. 5 further differs from FIG. 4 in that the method of FIG. 5 further comprises performing 504 another context switch back to the first thread. Performing the other context switch to the first thread may include overwriting 506 each of the context registers 110 (e.g., by storing, into each of the context registers 110, "0" or another value, thereby "purging" the context registers 110), where overwriting 506 each of the context registers 110 includes loading 508 (e.g., after "purging" the context registers), into the determined context registers 110 (e.g., the context registers 110 used by the first thread at the preferred preemption point) the saved values.

Figure 6:
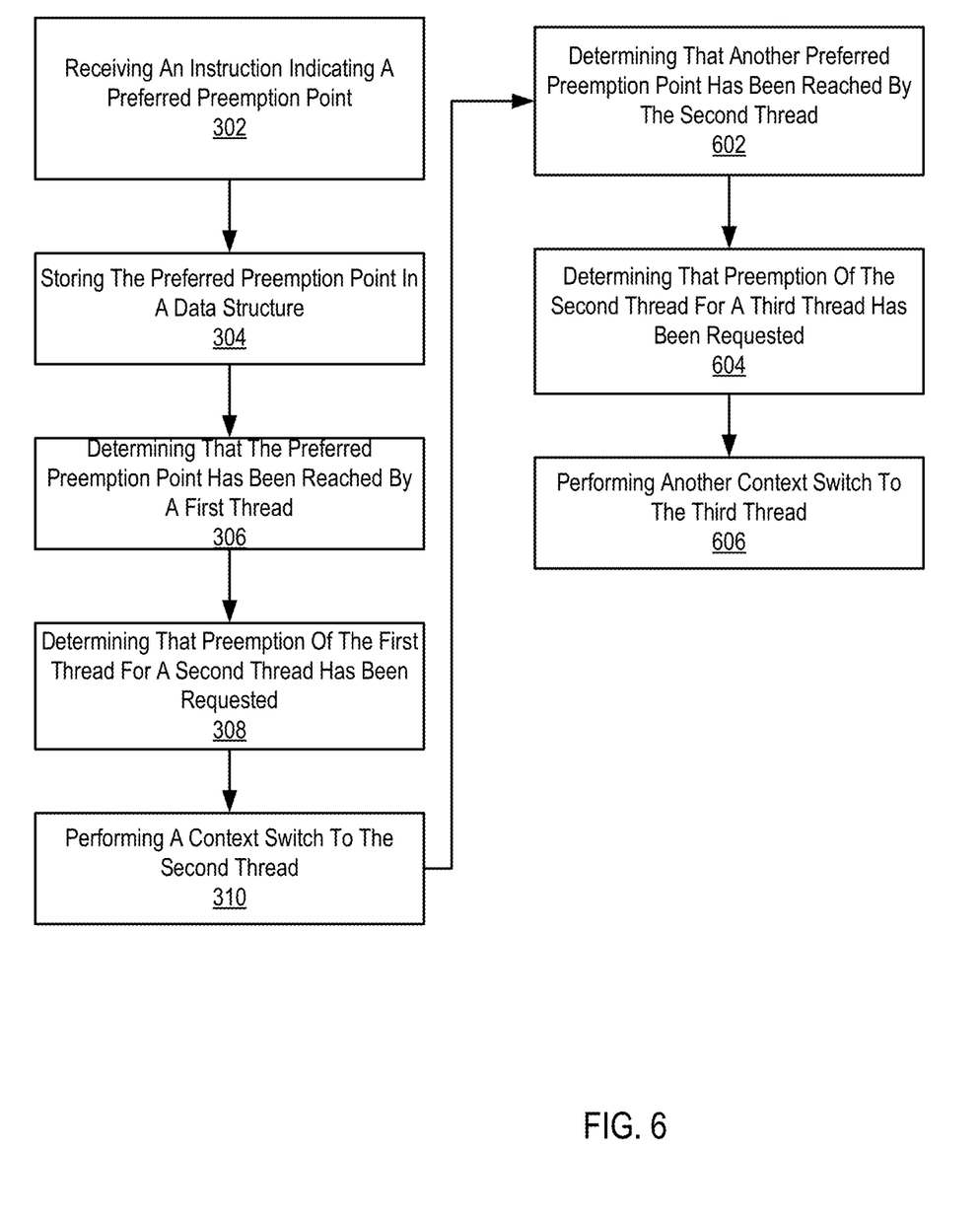
FIG. 6 is a flowchart of an example method for compiler-optimized context switching.

For further explanation, FIG. 6 sets forth a flow chart illustrating a further exemplary method for compiler-optimized context switching according to embodiments of the present invention that includes: receiving 302 an instruction indicating a preferred preemption point; storing 304 the preferred preemption point in a data structure, determining 306 that the preferred preemption point has been reached by a first thread 306, determining 308 that preemption of a first thread for a second thread has been requested, and performing 310 a context switch to the second thread.

FIG. 6 differs from FIG. 3 in that the method of FIG. 6 further comprises determining 602 that another preferred preemption point has been reached by the second thread (e.g., by comparing the current program counter value to the one or more entries in the PPP Array 106), determining 604 that preemption of the second thread has been requested by a third thread (e.g., based on a state of a PPPEO bit), and performing 606 a context switch from the second thread to the third thread. Performing the context switch to the third thread may comprise determining one or more context registers 110 used by the second thread and saving one or more values of the determined one or more context registers 110. Performing the context switch to the third thread may also comprise overwriting each of the context registers 110. Overwriting each of the context registers 110 may include "purging" the context registers 110 by storing a value (e.g., "0", a random value, another predefined value) in each of the context registers 110. Overwriting each of the context registers 110 may also include "restoring" one or more saved values associated with the third thread by loading these one or more saved values into their respective context registers 110.

In view of the explanations set forth above, readers will recognize that the benefits of compiler-optimized context switching according to embodiments of the present invention include:

- The use of instructions to identify preferred preemption points prior to encountering them during execution, requiring that these instructions need only be executed once for a processor to know the addresses of preferred preemption points for a given function.
- Reduced risk of data leakage between threads by overwriting context registers as part of a context switch. Efficiency may be increased by overwriting all context registers, instead of overwriting only selectively determined context registers. Further efficiency is achieved by overwriting all context registers using a single instruction.
- Reduced processing and time costs in performing a context switch by only saving values stored in registers used by a function at the preferred preemption point.
- Leveraging reserved bits of existing registers for improved compatibility with existing processors.

Exemplary embodiments of the present invention are described largely in the context of a fully functional computer system for compiler-optimized context switching. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of compiler-optimized context switching, the method comprising:
    receiving processor-executable instructions indicating a preferred preemption point comprising an instruction address, wherein a compiler inserts, into the processor-executable instructions, a data table indicating which context registers of a plurality of context registers are in use at the preferred preemption point, and wherein the processor-executable instructions further comprise additional instructions to update the data table during the execution of the processor-executable instructions;
    storing the preferred preemption point in a data structure;
    determining, based on the data structure, that the preferred preemption point has been reached by a first thread;
    determining that preemption of the first thread for a second thread has been requested; and
    performing a context switch to the second thread, wherein performing the context switch to the second thread comprises overwriting each of the plurality of context registers prior to loading one or more context registers, of the plurality of context registers, used by the second thread.

2. The method of claim 1, wherein the processor-executable instructions indicating the preferred preemption point comprise a first operand representing the instruction address of the preferred preemption point and a second operand representing an N-bit hash code index specifying which of a plurality of preferred preemption points to overwrite within the data structure.

3. The method of claim 2, wherein performing the context switch to the second thread comprises:
    determining one or more context registers, of the plurality of context registers, used by the first thread, including referencing the data table; and
    saving values stored in the determined one or more context registers prior to overwriting each of the plurality of context registers.

4. The method of claim 3, wherein performing the context switch to the second thread comprises:
    causing an exception handler to interrupt execution of the first thread; and
    saving values held in context registers within the exception handler.

5. The method of claim 3, wherein determining the one or more context registers, of the plurality of context registers, used by the first thread comprises:
    obtaining a value of a hash code that identifies which particular preemption point of the plurality of preferred preemption points was encountered by consulting a register; and
    consulting the data table which describes which context registers are in use at the particular preemption point.

6. The method of claim 3, wherein determining the one or more context registers, of the plurality of context registers, used by the first thread comprises:
    obtaining an address of an instruction that was recognized as a second preferred preemption point by consulting a register; and
    using the recognized address of the instruction as a hash code to consult the data table which describes which context registers are in use at the second preferred preemption point.

7. The method of claim 1, wherein the received processor-executable instructions indicate a plurality of preferred preemption points, each comprising an instruction address, wherein the data table inserted into the processor-executable instructions indicates which context registers of the plurality of context registers are in use at each of the plurality of preferred preemption points.

8. An apparatus for compiler-optimized context switching, the apparatus comprising a processor, wherein the processor of the apparatus is configured to perform steps comprising:
    receiving processor-executable instructions indicating a preferred preemption point comprising an instruction address, wherein a compiler inserts, into the processor-executable instructions, a data table indicating which context registers of a plurality of context registers are in use at the preferred preemption point, and wherein the processor-executable instructions further comprise additional instructions to update the data table during the execution of the processor-executable instructions;
    storing the preferred preemption point in a data structure;
    determining based on the data structure, that the preferred preemption point has been reached by a first thread;
    determining that preemption of the first thread for a second thread has been requested; and
    performing a context switch to the second thread, wherein performing the context switch to the second thread comprises overwriting each of the plurality of context registers prior to loading one or more context registers, of the plurality of context registers, used by the second thread.

9. The apparatus of claim 8, wherein the processor-executable instructions indicating the preferred preemption point comprise a first operand representing the instruction address of the preferred preemption point and a second operand representing an N-bit hash code index specifying which of a plurality of preferred preemption points to overwrite within the data structure.

10. The apparatus of claim 9, wherein performing, by the processor, the context switch to the second thread comprises:
   determining one or more context registers, of the plurality of context registers, used by the first thread; and
   saving values stored in the determined one or more context registers prior to overwriting each of the plurality of context registers.

11. The apparatus of claim 10, wherein performing, by the processor, the context switch to the second thread comprises:
   causing an exception handler to interrupt execution of the first thread; and
   saving values held in context registers within the exception handler.

12. The apparatus of claim 10, wherein determining the one or more context registers, of the plurality of context registers, used by the first thread comprises:
   obtaining a value of a hash code that identifies which particular preemption point of the plurality of preferred preemption points was encountered by consulting a register; and
   consulting the data table which describes which context registers are in use at the particular preemption point.

13. The apparatus of claim 10, wherein determining the one or more context registers, of the plurality of context registers, used by the first thread comprises:
   obtaining an address of an instruction that was recognized as a second preferred preemption point by consulting a register; and
   using the recognized address of the instruction as a hash code to consult the data table which describes which context registers are in use at the second preferred preemption point.

14. The apparatus of claim 8, wherein the received processor-executable instructions indicate a plurality of preferred preemption points, each comprising an instruction address, wherein the data table inserted into the processor-executable instructions indicates which context registers of the plurality of context registers are in use at each of the plurality of preferred preemption points.

15. A computer program product for compiler-optimized context switching, the computer program product disposed upon a non-transitory computer readable medium, the computer program product comprising computer program instructions that, when executed, cause a computer to carry out the steps of:
   receiving processor-executable instructions indicating a preferred preemption point comprising an instruction address, wherein a compiler inserts, into the processor-executable instructions, a data table indicating which context registers of a plurality of context registers are in use at the preferred preemption point, and wherein the processor-executable instructions further comprise additional instructions to update the data table during the execution of the processor-executable instructions;
   storing the preferred preemption point in a data structure;
   determining, based on the data structure, that the preferred preemption point has been reached by a first thread;
   determining that preemption of the first thread for a second thread has been requested; and
   performing a context switch to the second thread, wherein performing the context switch to the second thread comprises overwriting each of the plurality of context registers prior to loading one or more context registers, of the plurality of context registers, used by the second thread.

16. The computer program product of claim 15, wherein the processor-executable instructions indicating the preferred preemption point comprise a first operand representing the instruction address of the preferred preemption point and a second operand representing an N-bit hash code index specifying which of a plurality of preferred preemption points to overwrite within the data structure.

17. The computer program product of claim 16, wherein performing the context switch to the second thread comprises:
   determining one or more context registers, of the plurality of context registers, used by the first thread; and
   saving values stored in the determined one or more context registers prior to overwriting each of the plurality of context registers.

18. The computer program product of claim 17, wherein performing the context switch to the second thread comprises:
   causing an exception handler to interrupt execution of the first thread; and
   saving values held in context registers within the exception handler.

19. The computer program product of claim 17, wherein determining the one or more context registers, of the plurality of context registers, used by the first thread comprises:
   obtaining a value of a hash code that identifies which particular preemption point of the plurality of preferred preemption points was encountered by consulting a register; and
   consulting the data table which describes which context registers are in use at the particular preemption point.

20. The computer program product of claim 15, wherein the received processor-executable instructions indicate a plurality of preferred preemption points, each comprising an instruction address, wherein the data table inserted into the processor-executable instructions indicates which context registers of the plurality of context registers are in use at each of the plurality of preferred preemption points.

* * * * *